United States Patent [19] [11] 4,312,008

Taub et al. [45] Jan. 19, 1982

[54] IMPULSE JET HEAD USING ETCHED SILICON

[75] Inventors: Howard H. Taub, San Jose; Peter H. Wolf, Mission Viejo, both of Calif.

[73] Assignee: Dataproducts Corporation, Woodland Hills, Calif.

[21] Appl. No.: 90,552

[22] Filed: Nov. 2, 1979

[51] Int. Cl.³ .............................................. G01D 15/18

[52] U.S. Cl. .................................................. 346/140 R

[58] Field of Search ...................................... 346/140 R

[56] References Cited

U.S. PATENT DOCUMENTS 3,988,745 10/1976 Sultan .............................. 346/140 R 4,189,734 2/1980 Kyser .......................... 346/140 R X 4,216,477 8/1980 Matsuda ............................. 346/140

OTHER PUBLICATIONS

Brownlow et al; Ink on Demand Using Silicon Nozzles; IBM Tech. Disc. Bulletin; vol. 19, No. 6, Nov. 1976, pp. 2225-2256.

Holland et al; Porous Silicon Technique for Fabricating Drop-On-Demand Ink Jet Structures; IBM Tech. Disc. Bulletin, vol. 22, No. 2, Jul. 1979, pp. 783-784.

*Primary Examiner*—Joseph W. Hartary

*Attorney, Agent, or Firm*—Spensley, Horn, Jubas & Lubitz

[57] ABSTRACT

An improved impulse jet head structure utilizing etched silicon as the body of the structure. A silicon substrate is etched so as to form a nozzle groove, cavity, and ink supply groove. A layer of glass or other material is bonded to the top of the substrate so as to enclose the cavity and define, along with the grooves, and ink supply conduit and a nozzle conduit. A second layer of glass or other material is bonded to the bottom of the substrate and comprises the bottom surface of the cavity. A piezoelectric crystal driver is bonded to the bottom layer in a position corresponding to the location of the reservoir. An ink supply tube is bonded to the upper layer in a location above the supply groove and delivers ink to the head structure. The etching process may be utilized to form either single or multiple orifice head structures.

10 Claims, 7 Drawing Figures

IMPULSE JET HEAD USING ETCHED SILICON

BACKGROUND OF THE INVENTION

1. Field of the Invention

This invention relates to impulse jet printing. Generally, the impulse jet head structure includes an ink cavity which is periodically constricted by the application of an electrical pulse to an electromechanical element, such as a piezoelectric transducer, which is positioned adjacent to the cavity. The constriction of the cavity causes drops to be ejected from an orifice in the head structure.

The resoluton of an impulse head structure, i.e., the degree to which the size of the drops which are formed and the spacing between adjacent channels in an array structure can be controlled, is a function of the accuracy with which the orifice portion of the head structure can be manufactured. In order to provide a head structure which will meet the resolution requirements of word processing printing, tolerances on the order of 0.001 inches and better are required. These high resolution requirements have heretofore been difficult to achieve and have limited the use of impulse jet printers in word processing systems.

2. Description of the Prior Art

Generally, impulse jet head structures are made of plastic or ceramic, such as is shown in U.S. Pat. No. 4,057,807, or of glass, such as is shown in U.S. Pat. No. 3,972,474. The use of such materials limits the resolution capability of the head structure. This limited resolution capability in the manufacturing process in turn limits the accuracy in the size of drops which are ejected from the head structure, as well as how close adjacent channels in an array structure may be placed.

It is possible to etch extremely well defined grooves and holes in silicon using an anisotropic etchant which attacks different atomic planes in silicon at different rates. This etchant, which contains ethelyene diamine, pyrocatechol and water, is widely used in the semiconductor industry in the fabrication of integrated circuit devices. Because of the ability to produce very high resolution grooves and holes in silicon wafers, the anisotropic etching technique has found application in other areas, such as the manufacture of strain gauges and micro-optical fixtures to align fiber optics with other optical components. Other applications more closely related to the present invention have also been developed. Ink jet nozzles made from a silicon substrate are disclosed in U.S. Pat. Nos. 3,921,916 to Bassous, 3,958,255 to Chiou et al., and 4,007,464 to Bassous et al. U.S. Pat. No. 4,047,184 to Bassous, et al. discloses a combined nozzle and charge electrode structure which is formed by etching a silicon substrate. The use of etched silicon substrates in ink jet printers has been limited, however, to individual components, such as the nozzle or charge electrode, and has not been applied to the formation of an entire impulse jet head structure.

SUMMARY OF THE INVENTION

The present invention is directed to the use of an anisotropically etched silicon substrate for the formation of an entire impulse jet head structure. A silicon substrate is etched to form a nozzle groove, a cavity and a supply groove. The etching is very precise and therefore permits the formation of extremely high resolution head structures. The head structure includes a bottom layer, made of metallic or other material and attached to the substrate, which serves as the bottom of the cavity. A piezoelectric crystal driver is attached to the bottom layer in a position corresponding to the location of the cavity. A smooth upper layer is placed over the top of the substrate and, along with the grooves, serves to define a supply conduit, a nozzle conduit and an orifice. By forming all of the cavities of the head structure in a single silicon substrate, the cost of the head structure may be significantly reduced. In addition, a plurality of head structures may be formed on a single substrate, thus further reducing the cost of manufacture. Therefore, the present invention provides an impulse jet head structure which is an improvement over the prior art both in terms of resolution and potential for low manufacturing cost.

DESCRIPTION OF THE PREFERRED EMBODIMENTS

Figure 1:
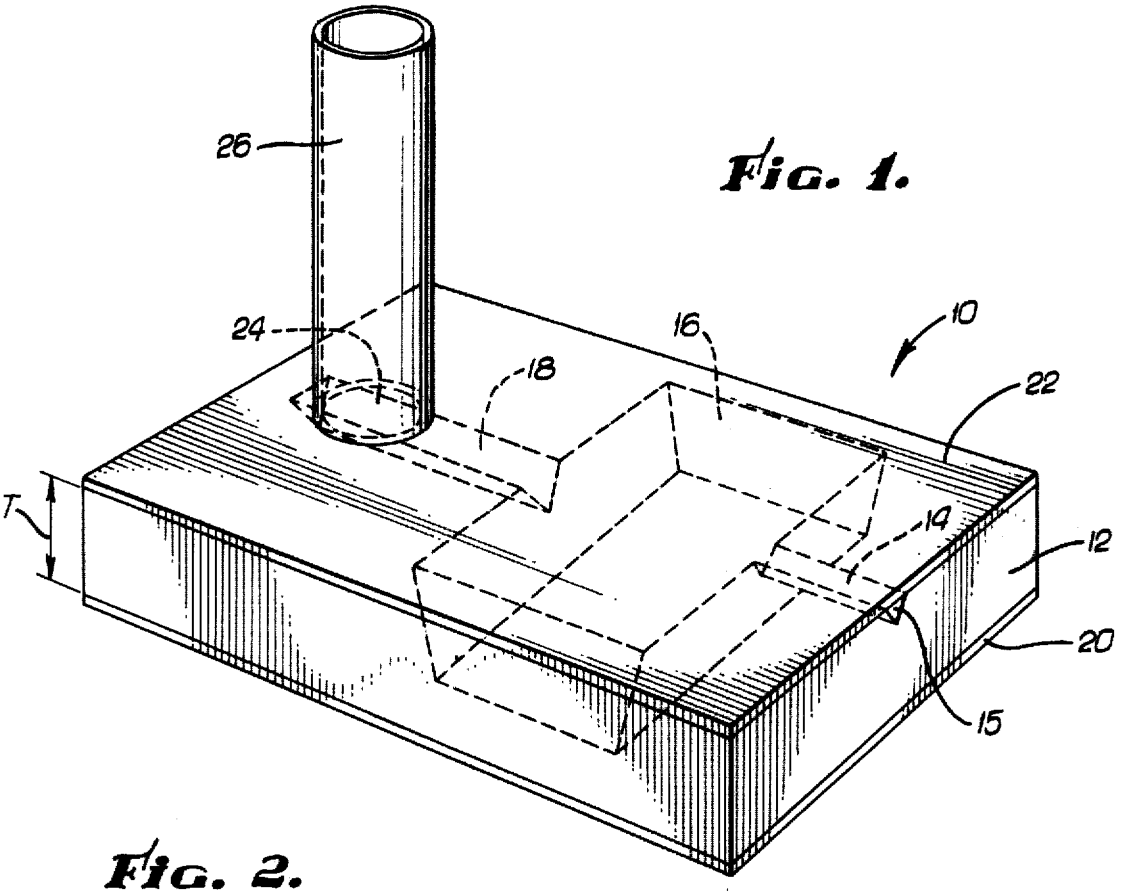
FIG. 1 is a perspective view of a single integrated ink jet head structure according to the present invention.
Figure 2:
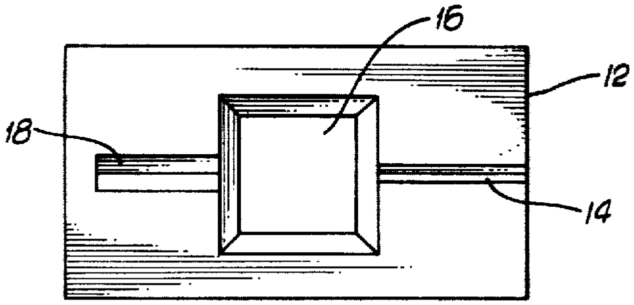
FIG. 2 is a top plan view of an etched silicon substrate utilized in the structure of FIG. 1.
Figure 4:
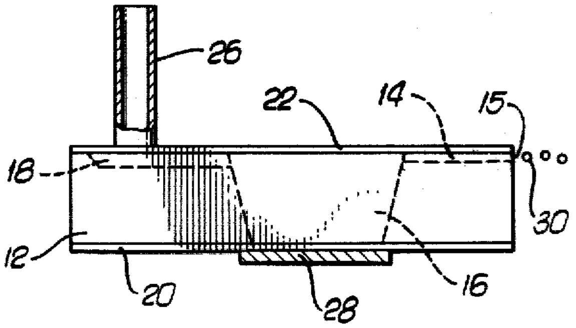
FIG. 4 is a side plan view of the head structure.
Figure 3:
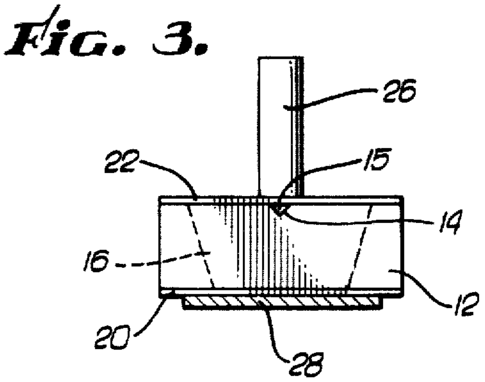
FIG. 3 is a front plan view of the head structure.

Referring now to FIGS 1-4, an impulse jet head structure 10 includes a silicon substrate 12 which is anisotropically etched in order to form a nozzle groove 14, a cavity 16 and a supply groove 18. The substrate 12 has a (100) orientation, although (110) orientation silicon, among others, may be employed. The etchant which is used to form the grooves 14 and 18 and the cavity 16 is a mixture of ethelyene diamine, pyrocatechol and water. Various other anisotropic etchants, including aqueous sodium hydroxide, aqueous potassium hydroxide, aqueous hydrazene, tetramethyl ammonium hydroxide and a mixture of potassium hydroxide, N-propranol and water, could also be utilized.

If the silicon substrate wafer 12 is T units thick (typical thicknesses are between 0.008 and 0.02 inches) the width of the grooves 14 ad 18 can be up to $T\times\sqrt{2}$ inches wide and still form V-grooves. Given sufficient etching time (typically on the order of three hours) the etchant will etch completely through the substrate 12 to form the cavity 16.

Secured to the bottom of the substrate 12 is a base plate or layer 20 which may be made of a variety of materials. Included are thin film metallic materials, insulating materials such as glass, and heavily P-doped silicon. Other materials could undoubtedly be successfully used. A preferred alternative is the use of a thin glass plate which is bonded to the silicon using the technique of anodic bonding. One form of such a process is fully described in U.S. Pat. No. 3,397,278, issued to Pomerantz on Aug. 13, 1968, the disclosure of which is herein incorporated by reference. Basically, this technique is useful in bonding an electrically conductive element to an insulator element. The elements to be bonded are placed in abutting relationship and the insulator element is heated to a temperature sufficient to render it electrically conductive. An electric potential is then applied across the elements to pass an electric current through the points of contact and create an electrostatic field between the adjoining surfaces. The application of the electric potential causes a bond to be formed at the interface of the elements. In order to reduce the possibility of separation of the elements upon cooling, they should be chosen so that their thermal coefficients match very closely. No matter what material is chosen, the etching process of the cavity 16 will stop at the plate 20, which will therefore serve as the base of the cavity 16.

Bonded to the bottom of the layer 20 directly beneath the cavity 16 is a piezoelectric crystal driver plate 28. The piezoelectric driver 28 can be bonded to the layer 20 by using low temperature indium based solders. The thickness of the layer 20 is such that when the piezoelectric driver 28 is energized, it will flex and cause the volume of the cavity 16 to be reduced.

Attached to the top of the substrate 12 is a thin layer or plate 22 which is similar to the layer 20. As with the layer 20, the layer 22 may be made of various materials, but it is preferred that it be glass which is anodically bonded to the substrate 12. The layer 22 forms a cover for the grooves 14 and 18 and for the cavity 16. The groove 14 and the layer 22 define a nozzle conduit and an orifice 15, while the groove 18 and the layer 22 define a supply conduit. An opening 24 is formed in the layer 22 above the groove 18. If the layer 22 is glass, the opening 24 may be formed by ultrasonic drilling. If the layer 22 is made of silicon (in which case it would be attached to the substrate 12 by eutectic bonding), the opening 24 can be made by anisotropic etching. A tube 26 is secured to the layer 22 over the opening 24, and is connected to a supply of ink (not shown).

The operation of the head structure 10 is such that ink is supplied through the tube 26 and the opening 24 to the groove 18. The cavity 16 will be filled with ink supplied from the groove 18. An electrical pulse to the piezoelectric driver 28 causes a sudden contraction of the volume of the cavity 16. This results in an increase in pressure which causes ink to be ejected through the nozzle groove 14 and orifice 15 to form drops 30. Ink in the cavity 16 is replenished by capillary action via the tube 26. For efficient transfer of fluid out of the orifice 15, it may be necessary to appropriately select the groove lengths and widths to increase fluid flow resistance out the rear groove 18.

Figure 5:
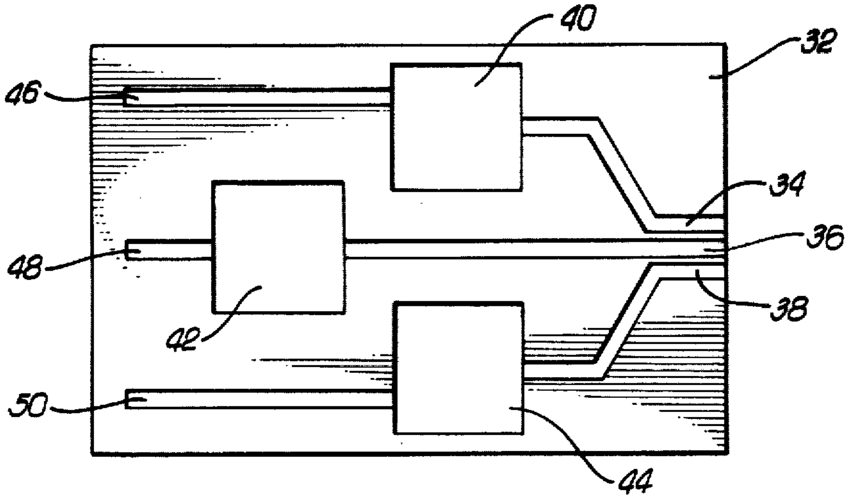
FIG. 5 is a top plan view of an etched silicon substrate for use in a multiple nozzle head structure.

The combination of the finely etched groove 14 and the upper layer 22 (which is a smooth surface that need not be etched) results in a nozzle section which has an extremely high resolution. Therefore, the size of the drops 30 can be controlled to a high degree of precision. In addition, the use of the single substrate 12 greatly simplifies the manufacture of the head structure 10. The structure therefore has the dual advantage of being very precise and very inexpensive. In addition, the etching technique lends itself to the formation of a head structure on a single substrate which includes a plurality of channels or nozzles. As shown in FIG. 5, a single substrate 32 may be used to make a multiple orifice head structure. In such a case, three nozzle grooves 34, 36 and 38 are etched and extend rearwardly from the front of the substrate 32 to three cavities 40, 42, and 44, respectively. The outer grooves 34 and 38 fan out in order to meet the cavities 40 and 44. Three supply grooves 46, 48 and 50 extend from the cavities 40, 42 and 44, respectively. The remainder of the head structure is formed identically to the single structure previously described. Each cavity 40, 42 and 44 utilizes a separate piezoelectric driver. The widths of the grooves will vary depending on the specific geometry of each channel, so as to functionally result in identical drop formation characteristics for each channel.

Figure 6:
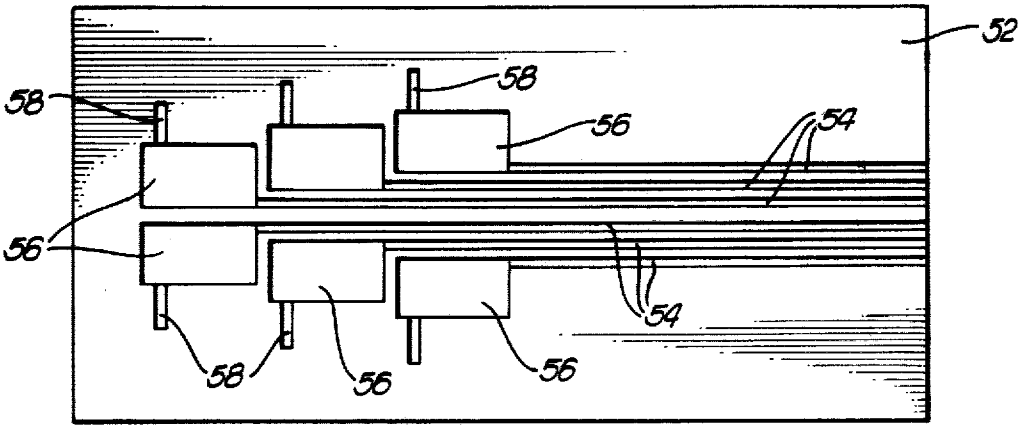
FIG. 6 is a top plan view of a silicon substrate showing an alternate multiple nozzle etching arrangement.

As an alternative to the fan-type arrangement of FIG. 5, a plurality of parallel nozzle grooves 54 may be formed as shown in FIG. 6. Each of the nozzle grooves 54 is connected to an associated cavity 56 which is in turn connected to a supply groove 58. The use of either of the substrates 32 or 52 would result in a multi-orifice head structure whose design complexity is no greater than the single orifice structure described above.

Figure 7:
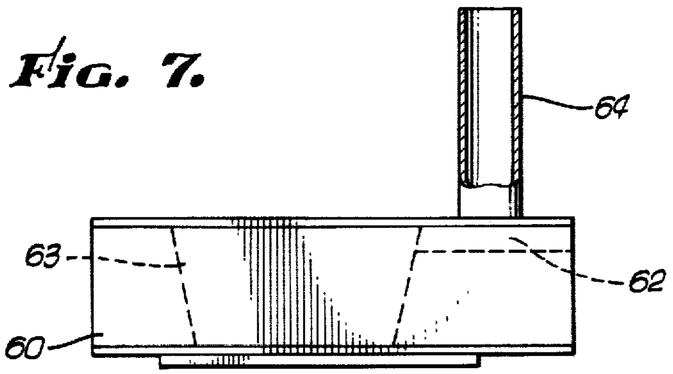
FIG. 7 is a side plan view of an alternate embodiment of a head structure.

Referring now to FIG. 7, the present invention can also be applied to head structures which utilize the "Stemme" technology, wherein the ink is replenished via a channel close to the orifice. A substrate 60 includes a groove 62 and a reservoir 63. Ink is supplied via tube 64 directly to the groove 62 rather than to a separate supply groove. The use of this technique extends the limit of drop rates from a new thousand drops per second for a head of the type shown in FIG. 1 to several tens of thousands of drops per second.

Although the present invention has been described in terms of use with a non-pressurized ink jet in which ink drops are produced on-demand, it could be used for a pressurized or continuous ink jet structure, wherein ink is delivered to the cavity under pressure.

In summary, the present invention is directed to an impulse jet head structure which has increased resolution and is simple to manufacture. The structure includes a silicon body section which includes a first etched groove or channel extending rearwardly from the front of the body section, an etched cavity extending from the rear of the first groove, and a second etched groove or channel extending from the cavity. A lower metallic or insulating layer is bonded to the bottom of the body section and a piezoelectric crystal driver is bonded to the lower layer in a location corresponding to the reservoir. An upper insulating or metallic layer is bonded to the top of the body section and includes an opening over the second groove through which ink is delivered to the groove. One end of an ink supply tube is attached to the upper layer over the opening. The combination of the upper layer and the first etched groove forms a nozzle conduit and orifice having a high degree of resolution. The etching technique is such that a multi-orifice head structure can easily be manufactured. In addition, the second etched groove may be omitted and the supply tube be attached so as to directly feed the first etched groove, thereby increasing the maximum possible drop rate.

Although particular embodiments of the invention have been described and illustrated herein, it should be noted that variations and modifications will occur to those skilled in the art. Consequently, it is intended that the claims be interpreted to cover such modifications and equivalents.

What is claimed is:

1. An impulse jet head structure, comprising:

a silicon body section having a front edge and upper and lower surface, said body section including a first groove etched into one of said surfaces and extending rearwardly from the front edge, an etched cavity extending through the body from the upper to the lower surface and coupled to the rear of the first groove, and a second groove etched into one of said surfaces and coupled to the cavity;

a base plate bonded to the lower surface of the body section;

a piezoelectric crystal driver bonded to said base plate;

an upper plate bonded to the upper surface of said body section, one of said plates including a supply opening over the second groove, the combination of the first groove and one of the plates defining a conduit and orifice through which ink is ejected from the cavity and the combination of the second groove and one of the plates defining a supply conduit; and a supply tube for supplying ink to the cavity, said supply tube being attached to one of the plates and covering said supply opening.

2. The head structure of claim 1 wherein said body section is silicon having a (100) orientation normal to the upper surface of the body.

3. The head structure of claim 1 wherein said body section is silicon having a (110) orientation normal to the upper surface of the body.

4. The head structure of claim 1 wherein said upper and lower plates are made of glass and are anodically bonded to the body section.

5. The head structure of claim 1 wherein said upper and lower plates are made of P-doped silicon.

6. The head structure of claim 1 wherein said upper and lower plates are made of a metallic film.

7. The head structure of claim 4 wherein said supply opening is formed by ultrasonic drilling.

8. The head structure of claim 5 wherein said supply opening is anisotropically etched.

9. An impulse jet heat structure, comprising:

a silicon body section having upper and lower surfaces and a front edge, said body section including a plurality of first grooves etched on one of the surfaces and extending rearward from the front edge, a plurality of etched cavities extending from the upper to lower surface of the body section, one each coupled to each first groove, and a plurality of supply grooves etched in one of the surfaces, one supply groove extending from each cavity;

a lower plate attached to the lower surface of the body section;

a plurality of piezoelectric crystal drivers, one driver bonded to the lower plate beneath each cavity;

an upper plate attached to the top of the body section, one of said plates including an opening over each supply groove, said first grooves and one of said plates defining a plurality of conduits and orifices through which ink is ejected from the cavities and said second grooves and one of the plates defining a plurality of supply conduits; and a supply tube attached to one of the plates over each opening.

10. An impulse jet head structure, comprising:

a silicon body section having upper and lower surfaces and a front edge, said body section including a groove etched on one of said surfaces and extending rearward from the front edge, and an etched cavity extending from the top to bottom surface and coupled to the groove;

a base plate attached to the lower surface of the body section;

a piezoelectric crystal driver attached to the base plate beneath the cavity;

an upper plate attached to the upper surface of the body section, one of said plates having a supply opening through which ink is supplied to said cavity; and a supply tube attached to one of the plates at the supply opening.

* * * * *